United States Patent [19]

Watts

[11] Patent Number: 5,181,614
[45] Date of Patent: Jan. 26, 1993

[54] COIL DUNNAGE AND PACKAGE USING SAME

[76] Inventor: Ridley Watts, 34000 Cedar Rd., Gates Mills, Ohio 44040

[21] Appl. No.: 681,087

[22] Filed: Apr. 5, 1991

[51] Int. Cl.$^5$ ............................................. B65D 85/30
[52] U.S. Cl. ..................................... 206/584; 428/906
[58] Field of Search ............... 206/584, 521; 428/906

[56] References Cited

U.S. PATENT DOCUMENTS

| | | | |
|---|---|---|---|
| 390,442 | 10/1988 | Brigham . | |
| 425,042 | 4/1890 | Moseley et al. | 428/906 X |
| 727,055 | 5/1903 | Arnold | 428/906 X |
| 3,047,136 | 7/1962 | Graham | 206/584 |
| 3,074,543 | 1/1963 | Stanley | 206/584 |
| 3,347,036 | 10/1967 | Daniel . | |
| 3,481,455 | 12/1969 | Graham et al. | 206/584 X |
| 3,650,877 | 3/1972 | Johnson . | |
| 3,655,500 | 4/1972 | Johnson | 206/584 X |
| 3,723,240 | 3/1973 | Skochdopole et al. . | |
| 3,852,152 | 12/1974 | Werner et al. . | |
| 4,042,658 | 8/1977 | Collins . | |
| 4,247,289 | 1/1981 | McCabe . | |

FOREIGN PATENT DOCUMENTS 747107  11/1966  Canada .

Primary Examiner—Bryon P. Gehman
Attorney, Agent, or Firm—Watts Hoffmann Fisher & Heinke

[57] ABSTRACT

Improved dunnage made from spiral coils of paper that are recyclable and biodegradable, or from other thin, flexible, resilient strips. The coils are cylindrical or cylindrical with a transverse fold, and are randomly oriented in a container to provide cushioning for packaged articles. The coils are formed at the time of use by modifying the material used to cause it to coil and forming strips from the material. This eliminates the need for storage of bulky dunnage. Paper used to form the coils is stretched to cause it to coil. Apparatus concurrently forms plural coils from a web.

11 Claims, 4 Drawing Sheets

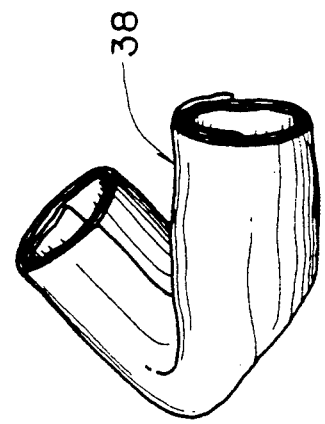
FIG. 7B
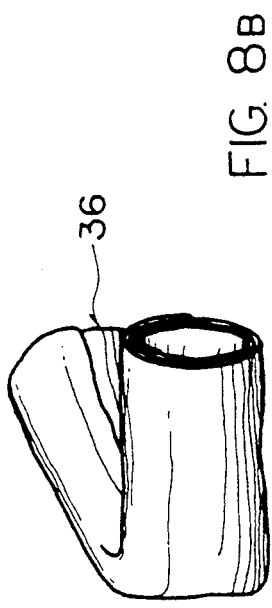
FIG. 8B
FIG. 9B
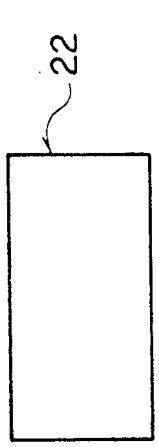
FIG. 7A
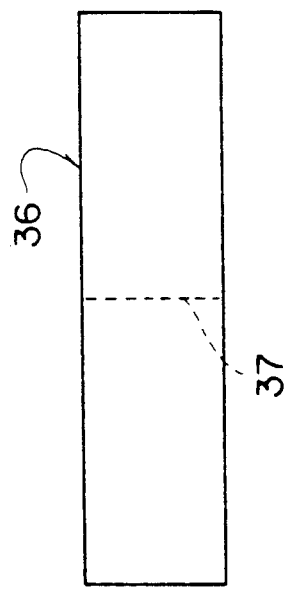
FIG. 8A
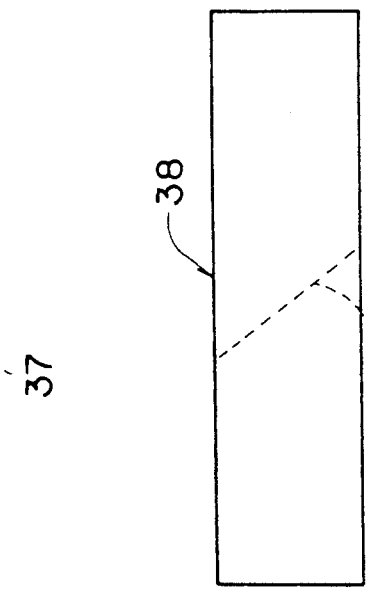
FIG. 9A

COIL DUNNAGE AND PACKAGE USING SAME

FIELD OF INVENTION

This invention relates to spiral coils, improved dunnage made from the coils, packages for articles that protect the articles by the use of the coils randomly oriented, and methods and apparatus for making the coils.

BACKGROUND OF INVENTION

It is common to protect articles being shipped in containers by filling extra space in the container with so called dunnage to isolate the articles from the container walls and inhibit movement of the articles within the container. Retailers, and especially those who specialize in catalog sales, typically use boxes that are not specifically designed in size or shape for particular articles and therefore they include substantial amounts of packing or dunnage in the boxes along with the article or articles shipped to reduce the risk of breakage.

Cushioning dunnage, such as excelsior, shredded newsprint, and the like has been in long use. More sophisticated materials and forms have also been proposed, such as the helical coil-like or tubular-like dunnage made from paper web shown in U.S. Pat. No. 3,650,877, or helically convoluted synthetic strands as shown in U.S. Pat. No. 3,347,036. Recent popular materials are plastic bubble sheets, particles or shapes of materials such as polystyrene, and other open-or closed-cell foamed materials.

All packaging is coming under attack because of disposal problems, especially due to the lack of adequate landfill facilities and the non-biodegradable properties of the popular plastic packing materials. The quantity of plastic dunnage used in packaging is so great, and the ability to recycle it is so poor, that the disposal problem is becoming unmanageable. While some industrial uses of polystyrene particles, to take one current example of a widely used dunnage material, permit collection and re-use, the great majority of such material is used for packing retail products that are widely distributed directly to consumers, who individually never receive enough to justify collection and recycling; yet in total, the amount of polystyrene packing used is making its disposal a major problem. The same is true of bubble pack. A further problem with such materials is the space they require for storage prior to use. The nature of the plastic dunnage is such that it takes as much space while stored as it does in use. Retailers and especially mail-order houses, find it necessary to provide large rooms or warehouses merely to hold the dunnage needed for shipping their products. This adds substantially to the packaging costs. Some of the non-plastic dunnage used, such as shredded newsprint, lacks structural strength and is easily compressed, and is disliked by retailers and customers because of the dirt and mess associated with its use, as well as the space it occupies unless the retailer does its own shredding, which still involves a less desirable packing operation than dispensing small plastic particles into a package.

SUMMARY OF THE INVENTION

The present invention overcomes the storage problem, the disposal problem and the difficulties in packing with shredded material. It provides low cost, small size, dunnage that can be formed and directly dispensed into packages by the retailer. In its preferred form, the dunnage itself is recycled material, can again be recycled, and is biodegradable. It is extremely compact before being formed and after use it can be compressed in volume to a small fraction of its volume as used.

The dunnage is small, resilient, spiral coils of thin, flexible, resiliant strips, most advantageously paper strips, randomly oriented in a container to fill unused space, retard relative movement of an article within the container, and typically also at least in part to isolate the article from the container walls and thereby cushion fragile articles against shock.

Convolutions of the strips forming the coils are preferably closely adjacent one to the next and provide rigidity in the axial direction, and they surround an open central area that facilitates transverse distortion, but with resilience due to the inherent properties of the paper. Optionally, a transverse fold can be formed in the coil, either perpendicular to the coil axis or at an angle to the axis, to reduce axial rigidity and to vary the manner in which the randomly oriented coils interrelate. A variety of the shapes can be used together in a single package, which variety as well as the proportions of the different constructions used varies the cushioning characteristics of the dunnage.

The preferred manner of forming the coils is to modify a length of paper in a manner to cause it to coil, then separate it into strips and then sever the coils; thereafter, if desired, creasing the coils transversely. Most advantageously, one side of the paper is stretched to cause it to coil.

Apparatus is provided for modifying the paper by stretching one side of the paper by bending it across a rigid edge, applying force and drawing the paper across the edge. The modified paper is cut into strips that then curl to form the coils. Advantageously, the paper is initially in the form of a rolled web and is continously fed and stretched across a narrow rigid edge, slit in its direction of travel by rotary cutters and cut transversely to desired length by a shear, so as to fall directly into a shipping carton on a platform or conveyor below the shear, thereby avoiding any need for storing the formed dunnage.

This invention has the advantages of being ecologically sound because the paper used is preferably fully or partially recycled and is recycleable after use and is biodegradeable, lower in cost than bubble wrap, styrene "peanuts" or the like, and paper wadding, and is without static cling. Hard wound rolls of kraft paper store in a fraction (estimated to be between about 1/80th and 1/200th, depending upon the density of the coils) of the space that would be required for styrene dunnage that would fill the same capacity as the spiral coils made from the roll. By controlling the degree to which the paper coils, as by varying the tension on the web and the force applied against the edge across which the web is drawn, which regulates the diameter of the coils, and by varying the length of the strips that form each coil, the softness or firmness of the coils and the bulk density can be changed to suit the needs of the articles being packaged. The number of cutting cycles performed can be easily coordinated with step-by-step advance of a conveyor moving cartons beneath the coil-forming machine to control the amount of dunnage dispensed into each carton, allowing a mix of carton sizes to be handled through pre-programmed control of the conveyor feed.

In its broader aspects then, the present invention relates to a container, an article within the container, and a multiplicity of randomly oriented separate spiral coils of thin, flexible, resilient strips within the container at least partially surrounding the article, the coils being relatively small with respect to the container and the article and substantially isolating the article from direct contact with the container. It also relates to the coils themselves, which are cylindrical, or cylindrical but modified with a transverse fold. More particularly, they comprise a spiral coil of paper having convolutions closely adjacent one to the next and central areas adjacent opposite ends of the coil that are surrounded by the convolutions and are large relative to the aggregate thickness of the convolutions. Where desired, a transverse fold or crease is formed in the coil creating a bend in the coil and a variation in the size of the central area between the ends of the coil.

The invention also relates to methods for concurrently forming a plurality of spiral coils of thin, flexible, resilient strips, and in its broad aspects this is accomplished by feeding along a path a length of thin, flexible, resilient material wider than individual coils to be formed, modifying the length of material along the path to cause the modified length to coil when unrestrained, temporarily restraining the modified length from coiling, separating the modified length into strips, and forming separate spiral coils from the strips.

The invention also relates to apparatus for concurrently forming a plurality of spiral coils of thin, flexible, resilient material, the apparatus having means for feeding along a path a length of the material wider than individual coils to be formed, means for modifying the length of material along the path to cause the modified length to coil when unrestrained, means for temporarily restraining the modified length from coiling, and means for separating the modified length into strips that form separate spiral coils.

BRIEF DESCRIPTION OF THE DRAWINGS

A preferred embodiment of the invention is shown in the accompanying drawings, in which:

FIGS. 7A and 7B are front and perspective views, respectively, of a cylindrical coil constructed in accordance with the present invention;

FIGS. 8A and 8B are front and perspective views, respectively, of a cylindrical coil having a transverse fold or crease that is perpendicular to the axis of the coil and constructed in accordance with the present invention; and FIGS. 9A and 9B are front and perspective views, respectively, of a cylindrical coil having a transverse fold or crease that is oriented at an angle not perpendicular to the axis of the coil and constructed in accordance with the present invention.

DESCRIPTION OF PREFERRED EMBODIMENTS

Figure 2:
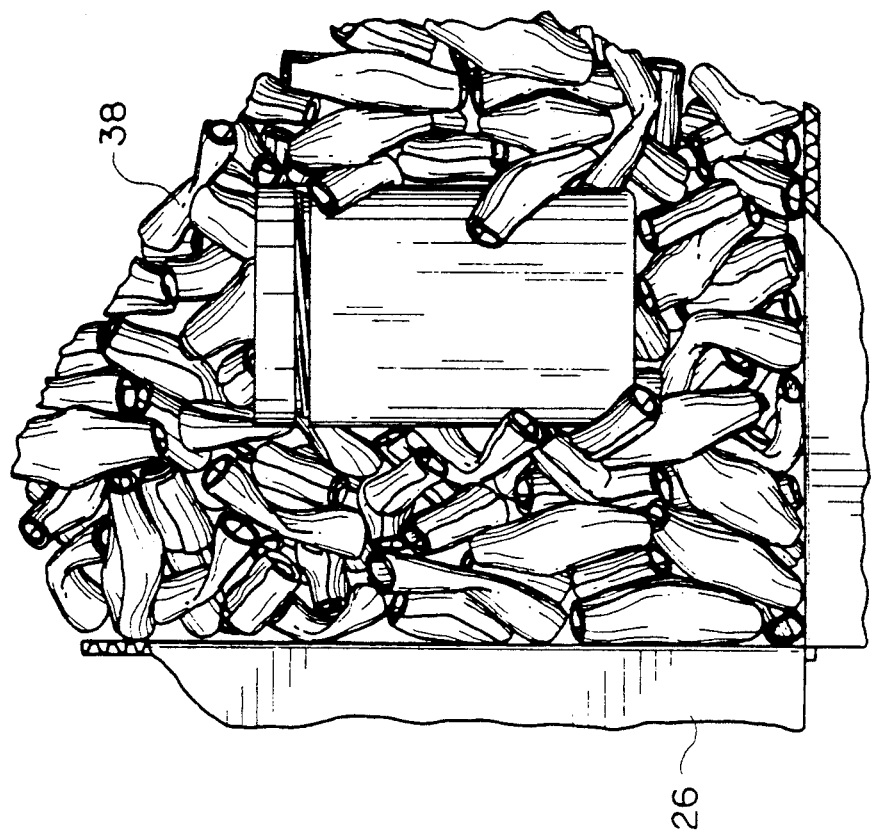
FIG. 2 is a partial top view of a partially filled, open package, diagrammatically indicating the manner in which spiral coils are randomly contained to protect a fragile article in a container.
Figure 1:
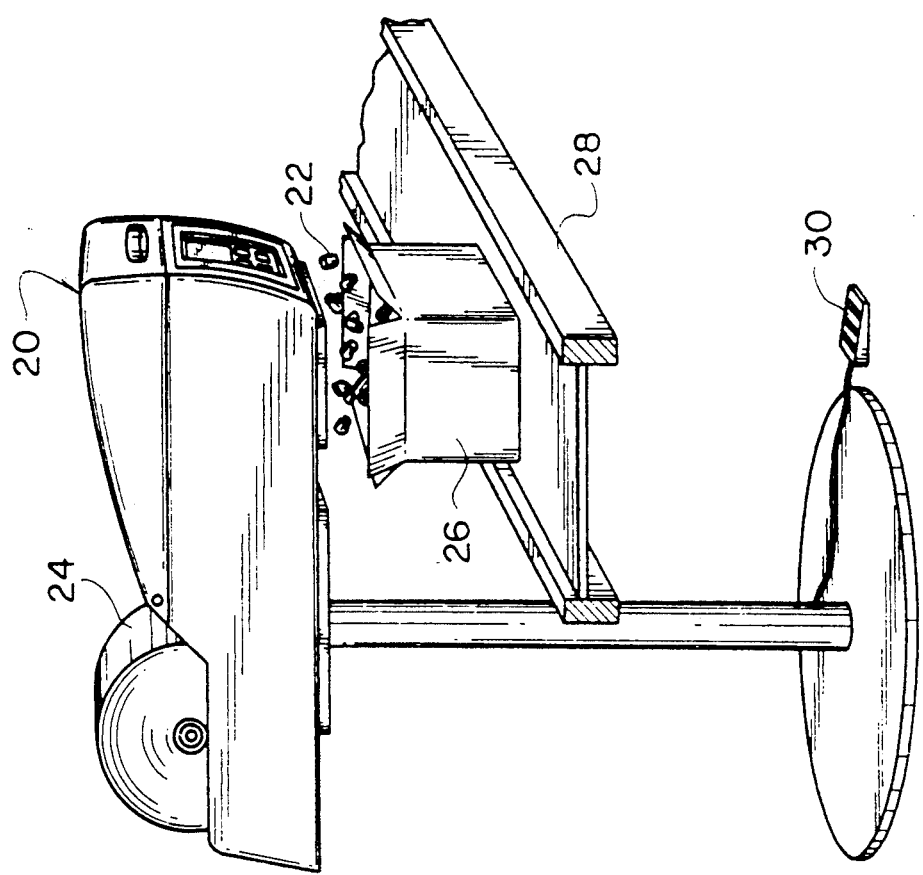
FIG. 1 is a perspective view of apparatus for forming and dispensing spiral coils for use as dunnage, in accordance with the present invention.

With reference to the drawings, a machine 20 is shown in FIG. 1 for forming spiral coils 22 from a roll of paper 24 and for depositing the coils directly into an open box 26 on a support 28 beneath the machine. The support 28 in the embodiment shown accomodates the sliding of the box to proper position. Typically, where random sized boxes are being used and the articles being packaged are fragile, an operator will dispense a layer of dunnage in the form of the coils, place an article or articles in the box, and then fill the remaining volume with additional dunnage, thereby isolating the packaged article from the walls of the box, as diagrammatically illustrated in FIG. 2. The forming and dispensing of the coils is advantageously controlled by a foot switch 30. For applications where continuous packaging of similar items in boxes of uniform size is desired, two machines 20 can be used in tandem and the support 28 can be in the form of a conveyor, moving the boxes to a first machine that dispenses a layer of coils, then to a station between the two machines where an article or articles are placed in the box, and then to the second machine where the box is filled with coils. In that type of operation, the machines can be set to automatically form and dispense a predetermined quantity of coils each time a container is detected at the machine station. Because the coils are formed as they are used, no storage of bulky dunnage is required.

The coils 22 are formed of a strip 34 of paper (FIG. 4 and FIG. 7B) convolutely coiled into a spiral. Preferably, convolutions C1 of the strip are closely adjacent one to the next and a central area A1 surrounded by the convolutions is large in the transverse direction relative to the thickness of a ring R formed by the convolutions C1. The thickness of the ring is sufficient to provide substantial axial strength or rigidity to the coil, while the inherent flexiblility of the paper, along with the thickness of the ring and the relatively large central area A1 provides transverse resilience and "give," so that together those properties along with the random orientation of the coils in a container provide good isolation and cushioning of packaged articles. However, the convolutions can be more uniformly spaced throughout the area within the outer circumference of the coil. A preferred spiral coil 22 is made of a strip of 30 to 100 pound basis weight kraft paper (virgin, recycled, or a combination), between ¾ inch and 2½ inches wide and between about 3 and 10 inches long. The outside diameter of the coil is between about ⅜ and ⅞ inch. Coils of these dimensions are useful for protecting articles having a large variation in size and weight. Of course, greater stiffness and larger coils can be achieved if necessary by using heavier paper, longer and wider strips and controlling the outside diameter by varying the extent to which the paper is modified to cause it to coil, or conversely, softer and smaller coils can be achieved in the opposite manner.

In accordance with the invention, the characteristics of the coils are modified in two additional embodiments 36 and 38, shown in FIGS. 8A, 8B and 9A, 9B, respectively. These coils are approximately twice as long as the coil 22, but otherwise are identically formed before modification. Each is then folded or creased centrally of the ends, transversely of the coil axis as indicated by the dotted lines 37, 39, resulting in a bent shape as shown in FIGS. 8B and 9B. The fold 37 is perpendicular to the coil axis and results in the two portions 36a and 36b being angularly related in a common plane to which the fold is perpendicular. The fold 39 is at other than a 90 degree angle to the axis of the coil, between 30 and 60 degrees and preferably 45 degrees, resulting in the two portions 38a and 38b being angularly related in a common plane to which the fold 39 is not perpendicular. In the preferred embodiments, the angle at the fold is between about 90 and 140 degrees. As a result of the fold, the area within the ring of convolutions varies axially of the coil, being substantially eliminated at the fold and at a maximum and substantially circular in shape at the ends. These modified shapes do not have the direct column strength along their length that the cylindrical shape shown in FIGS. 7A and 7B has and interact with one another or with the other embodiments differently when randomly oriented in a container than do the cylindrically shaped coils. For example, the two angularly related portions 36a, 36b or 38a, 38b when compressed toward each other not only have give and resilience through distortion of the cross sectional shape, but also through changes in the angle between the two angularly related portions. In addition, with the angular fold 39, it is unlikely that either of the portions 38a, 38b will experience or effectively resist direct column loads, but will have greater transverse resistance to compressive loads at the central area where the fold is located. Thus, they may function with more uniformity; i.e., their resistance to load may not vary as greatly in different directions as the cylindrical shapes. The different shapes can be blended in varying proportions within a container to obtain different cushioning characteristics.

Apparatus for forming coils 22, 36 and 38 is shown in FIGS. 3-6. As shown, a roll 24 of kraft paper or other suitable paper, such as recycled paper, is rotatably supported so a continuous web 40 of the paper can be drawn from the roll and formed into coils. The web has a width sufficient to form several coils simultaneously, as shown in FIGS. 4A and 4B. While the web shown in FIG. 4A illustrates seven strips side-by-side, that is by way of a preferred example only and the number may vary depending upon the production desired. In FIG. 4B, the strips are shown just after coiled portions have been cut from the strips, and from that location will fall through a discharge opening of the machine or will first be folded and then discharged. The coils in FIG. 4B are located in the relationship they would have to the strips they are cut from in FIG. 4A, but the cutting mechanism that would be located between what is shown in the two figures is omitted.

Figure 3:
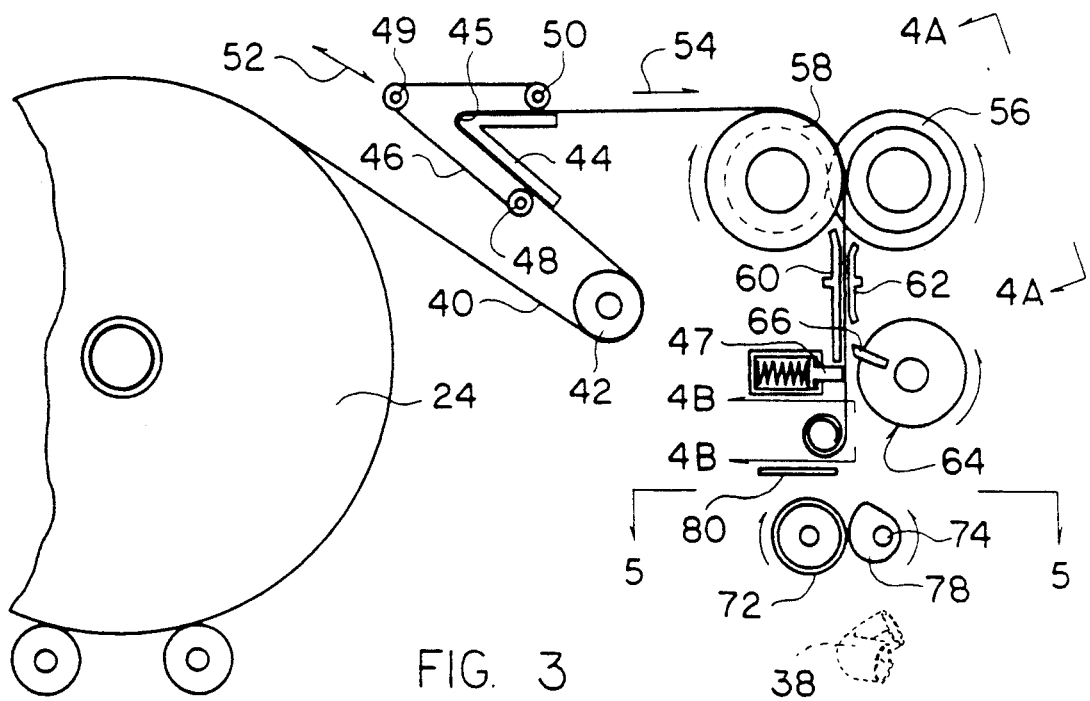
FIG. 3 is a diagrammatic view of apparatus for forming the coils in accordance with the invention.

The web is tensioned by an idler roll 42 and is bent over a V-shaped plate 44 that extends the width of the web. The apex of the V over which the web travels forms a narrow, but not cutting-sharp, rigid edge 45. The web is tensioned across the edge by an endless belt 46 that is as wide as the plate 44 and is entrained about three guide rolls 48, 49 and 50. The belt is in part in contact with the opposite side of the web from the web surface that slides across the plate and to that extent follows the contour of the web and V-shaped plate. This is assured by the placement of the rolls as shown in FIG. 3, owing to the close proximity of rolls 48, 50 to the surfaces of the plate. Tension on the belt is adjusted by the roll 49, which is movable in the direction of the arrow 52. By virtue of the belt tension against the web and across the edge 45, the belt is moved with the web by friction and applies force to the web against the edge 45.

Figure 4A:
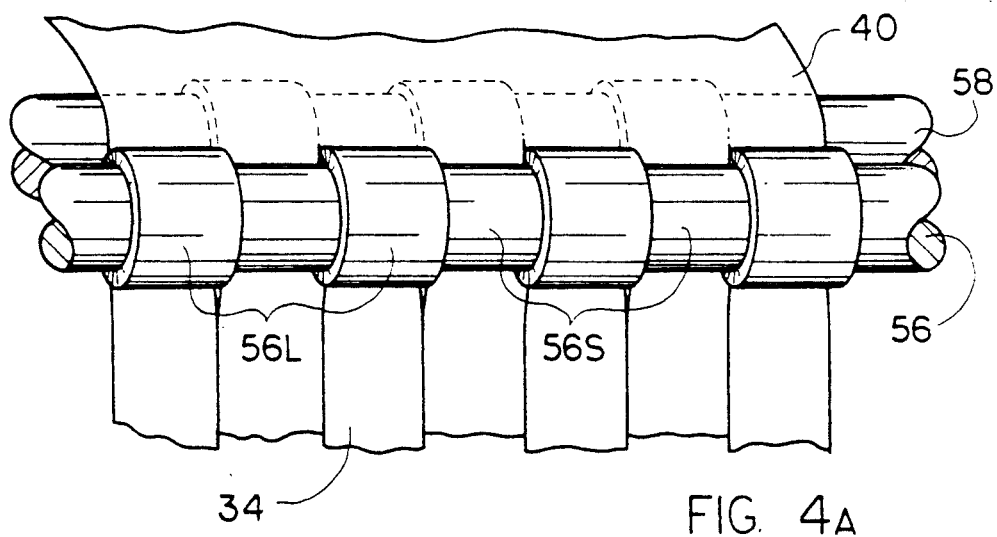
FIG. 4A is a partial perspective view of a web drive and slitting mechanism taken along the line 4A—4A of FIG. 3, with parts omitted, showing a part of the slitting apparatus and diagrammatically indicating the slitting of a length of paper.
Figure 4B:
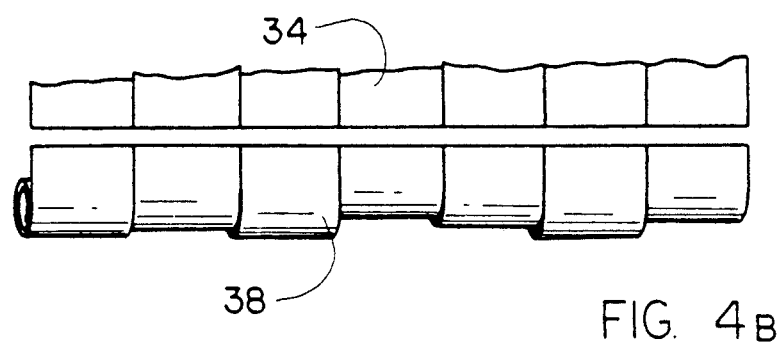
FIG. 4B is a partial perspective view, taken along the line 4B—4B of FIG. 3, of the coils severed from the strips of paper formed by the slitting apparatus.
Figure 5:
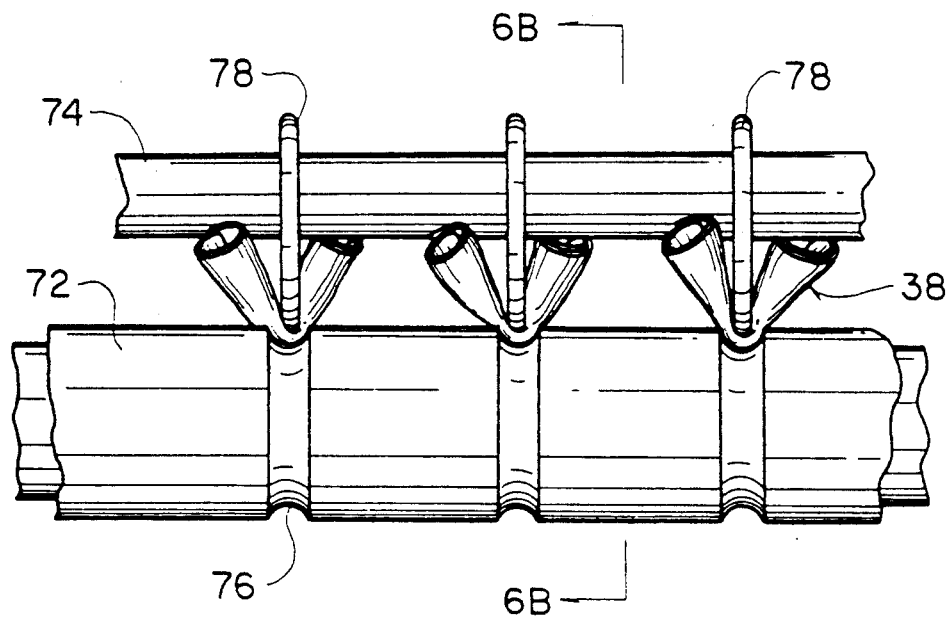
FIG. 5 is a top view taken along the line 5—5 in FIG. 3, showing a creasing mechanism and diagrammatically illustrating the folding of coils.

The web 40 is moved in the direction of the arrow 54 by two driven rolls 56, 58 that slit the web into strips 34 extending in the direction of web travel. As shown in FIG. 4A, the rolls have alternating larger and smaller diameter portions (shown at 56L and 56S on roll 56), each equal in length to the width of the strips to be cut. The larger diameter portions of each roll nest with the smaller diameter portions of the other with a small clearance and shear the web at the junctures to form strips as the web is pulled through the nip of the rolls, which are spaced closely together to frictionally engage the strips.

Guides 60, 62, directly below the rolls 56, 58, on opposite sides of the strips and closely spaced apart, allow the strips to move downward while preventing the strips from coiling. At the lower terminus of the guides, a cutting mechanism 64 severs the strips at a desired length. Those portions below the guides and cutting mechanism are allowed to coil, forming a spiral coil, preferably with closely adjacent convolutions and an open central area that is large relative to the thickness of the ring formed by the convolutions.

Figure 6A:
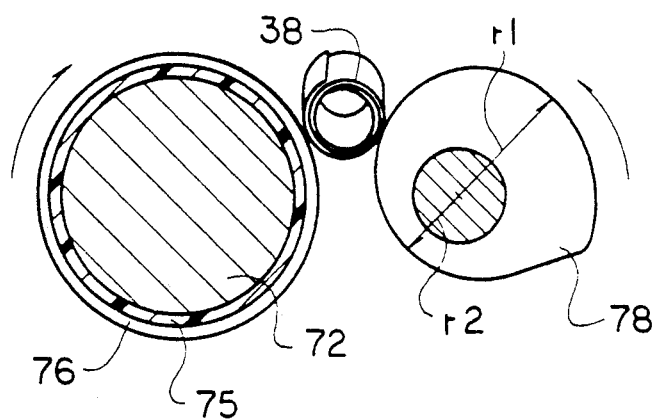
FIGS. 6A and 6B diagrammatically show the manner in which a coil of paper is received and then creased by the mechanism of FIG. 5, with FIG. 6B being taken along the line 6B—6B of FIG. 5.
Figure 6B:
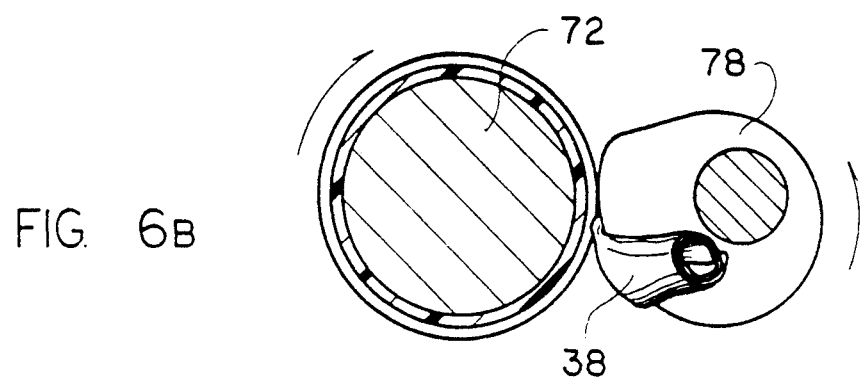

The cutting mechanism 64 utilizes a straight or slightly angled blade 66 that is on one side of and extends the width of the strips and is supported for rotation that will bring it into cutting contact with the strips. A non-rotatable blade 67 extends the width of the strips on the opposite side of the strips from the blade 66. The rotatable blade 66 acts against the blade 67 to shear the strips across the entire width of side-by-side strips. The blade 67 is supported for limited movement in the plane of the blade and is yieldably held in its operating position so that the two blades can properly cooperate to sever the coils from the strips as the rotatable blade is brought into contact with the strips. The blade 46 is rotated through one complete revolution each time the strips advance a desired distance past the cutting station, e.g., six to ten inches. Rotation is accomplished by a one-revolution drive, such as a reciprocatable rack and a driven pinion with a pawl and ratchet wheel connection to the shaft for one-direction rotation, or a single revolution clutch, the operation of which is timed from the rotation of the rolls 56, 58 that advance the web.

Where it is desired to fold or crease the coils to form the embodiments of FIGS. 8A, 8B or 9A, 9B, a folding mechanism 70 is located beneath the cutting mechanism 47, aligned to receive severed coils, fold them, and discharge them from the machine. As shown in FIGS. 3-6B, a side-by-side roll 72 and shaft 74 in a common horizontal plane extend the width of the strips 34, parallel with the coils and located to receive the coils between them. The roll 72 is of metal, coated with, or covered by a sleeve of, resilient material 75, such as plastic or rubber, and preferably has peripheral grooves 76. The roll 72 is larger in diameter than the coils 36 or 38, shown in FIGS. 8A and 9A. The shaft 74 has spaced cam-like discs 78 eccentrically disposed, each with a major radius r1 that extends just to or only slightly into opposed grooves 76, but out of contact with the surface of the roll 72. Each disc has a minor radius r2 that is located approximately 180 degrees from the major radius and that terminates substantially short of the surface of the roll 72, but close enough that the coils will not pass between the discs and the roll. The roll and shaft are counter-rotating as indicated by the directional arrows in FIG. 3 and rotation is continuous during operation of the machine. When a coil drops from the cutting mechanism it falls to a position shown in FIG. 6A, where it is supported by a disc and back-up roll and is pressed against the back-up roll as the disc and back-up roll counter rotate to bring the progressively larger radius portions of the disc into closer proximity to the roll 72, carrying the coil with them, folding or creasing the coil against the back-up roll and bending the end portions away from the roll, in part aided by the grooves 76. The roll and disc frictionally carry the creased or folded coil through the nip and discharge it below, as illustrated in FIG. 6B. In some cases, the coil may not land or stay parallel to the roll and shaft, but rather tip to one side or the other. In that case, the discs will form the fold at an angle to the coil axis as illustrated at 39 in FIGS. 9A and 9B instead of perpendicular to the axis as illustrated at 37 in FIGS. 8A and 8B.

Where it is desired to assure that the discs are tilted when received in the nip of the roll 72 and the discs 78, a thin rod 80 (FIG. 3) or the like is positioned in the path of each falling coil, beneath the cutting mechanism 64 and above the folding mechanism 70, adjacent one end of each coil so as to delay the downward movement of one end long enough to tip the axis of the coil from the horizontal, to approximately a 45 degree angle. The discs, especially at the edge surface portion leading into the major radius section, may be serrated or have a coating of high coefficient of friction to assure that the coils are pulled into the nip of the discs and back-up roll.

In operation, the driven rolls 56, 58 pull the web 40 from the roll 24 across the edge 45, slit the web into strips 34, and advance the strips to the cutting mechanism 64. The web is tensioned across the edge 45 by the idler roll 42, the pulling force of the drive rolls 56, 58, and the belt 46, which retards web movement owing to the fact that the belt is driven through frictional engagement with the web. In addition, the belt applies a force to the web in the direction of the edge to bend it sharply over the edge. As a result of the pulling and bending of the web across the edge, the opposite surface of the web from the one in direct contact with the edge is stretched relative to the surface in contact. This modifies the web in a manner that causes it to coil when the web tension is released and the web is not constrained, as when it exits the guides 60, 62 and the directly adjacent cutting mechanism 64. The individual coils that form beneath the cutting mechanism are concurrently cut from the supporting strips at intervals that are coordinated with the strip travel so that the coils are formed with a desired strip length to provide the desired strength and resilience to the coils. The coils are then discharged in cylindrical form or are folded in the manner described immediately above.

While the invention has been described with particularity, it will be appreciated that many variations and alterations may be made or features added, without departing from the spirit and scope of the invention set forth in the claims. For example, while paper is the preferred material because of the low cost and biodegradable properties and its ability to be recycled, as well as its inherent resilient qualities, other thin, flexible, resilient materials can be formed into coils and will function in a similar manner, and provide dunnage that will protect articles in containers and can be produced at the time and place the articles are packaged so as to eliminate bulky storage. It is believed that thin, flexible, resilient plastic sheets or webs, metal foils with proper temper, or laminates of plastic, metal foils and/or paper can be used. Where paper is used, it can be coated with materials that will promote coiling. Such coatings may be heat or moisture activated to shrink or expand and when applied to one side of a web and activated will cause coiling.

It has been found that the characteristics of paper web can be modified by forming flutes or ribbing along the length of the strips, as by embossing the paper during the travel from the roll 24 to the cutting mechanism 64. The increased bulk or effective thickness of the web results in an increased thickness of the ring R formed by the convolutions of the coil and a greater stiffness to the coil.

The paper dunnage can be dyed or printed with designs to provide distinctive packaging. Holiday colors such as green and red for christmas packing can be used as an attractive alternative to the mundane white or grey of plastic or brown of kraft paper. Existing dunnage fails to offer these options with the convenience and ease possible with the present invention.

Other uses than dunnage are also contemplated for the coils. For example, the coils can be used as animal bedding in kennels. For that application, the paper can be coated or impregnated with disinfectant, bug repellent, odor inhibitor, and/or a desirable fragrance, such as that of cedar or pine.

I claim:

1. A container, an article within the container, and a multiplicity of randomly oriented separate coils of thin, flexible, resilient strips within the container at least partially surrounding the article, said coils having overlapping, unsecured convolutions, the convolutions of each coil having a common axis, said coils being relatively small with respect to the container and the article and substantially isolating the article from direct contact with the container.

2. A container as set forth in claim 1 wherein each of said coils is a 30 to 100 pound basis weight kraft paper strip between about ¾ and 2½ inch wide and between about 3 and 10 inches in uncoiled length, substantially rigid in the axial direction of the coil and substantially resilient in directions transverse to the axial direction, the convolutions of each of said coils being closely adjacent one to the next forming a ring and a central area surrounded by the convolutions being large in the transverse direction relative to the thickness of the ring formed by the convolutions.

3. A container as set forth in claim 1 wherein the coils have a transverse fold in at least some of the coils creating a bend in the axis of each of those coils and an axial variation in the shape of those coils.

4. A container as set forth in claim 3 wherein the direction of the fold is substantially perpendicular to the direction of the axis.

5. A container as set forth in claim 3 wherein the direction of the fold is at an angle of between 30 and 60 degrees relative to the direction of the axis.

6. A container as set forth in claim 3 wherein the coils having a transverse fold include coils in which the direction of the fold is substantially perpendicular to the direction of the axis and coils in which the direction of the fold is at an angle of between 30 and 60 degrees relative to the direction of the axis.

7. A container, an article within the container, and dunnage within the container at least partially surrounding the article, said dunnage comprising a plurality of randomly oriented coils of thin, flexible, resilient strips, at least some of which have a transverse fold creating a bend between opposite ends and a variation in the cross sectional shape between the ends, said coils having overlapping, unsecured convolutions, said coils being relatively small with respect to the container and the article and substantially isolating the article from direct contact with the container, all of the overlapping convolutions of at least some of said coils having a common transverse fold.

8. A container, an article within the container, and a multiplicity of randomly oriented separate substantially circular rings of paper within the container, said multiplicity at least partially surrounding the article, said rings being comprised of overlapping, unsecured convolutions that have a common axis, said rings being relatively small with respect to the container and the article, substantially rigid in the axial direction and substantially resilient in directions transverse to the axial direction, the convolutions of each ring being closely adjacent one to the next and each ring having a central cross-sectional area surrounded by the convolutions that is large relative to the thickness of the ring formed by the convolutions.

9. A container, an article within the container, and a multiplicity of randomly oriented flexible tubes within the container at least partially surrounding the article, each of said tubes being at least in part generally circular in cross section and having a wall thickness small relative to the diameter of the generally circular cross section of the tube, said tubes being formed of coiled narrow strips of flexible material, each of the coiled strips having overlapping, unsecured convolutions that form the wall thickness, and at least some tubes having a transverse fold creating a bend between opposite ends and a variation in cross sectional shape between the ends, said tubes being relatively small with respect to the container and the article and substantially isolating the article from direct contact with the container.

10. A container, article and tubes as set forth in claim 9 wherein the transverse fold extends at other than a 90 degree angle to a plane intersecting the bend and opposite sides.

11. A container, an article within the container, and a plurality of randomly oriented separate coils, each of said coils being wound in a loose coil shape having overlapping, unsecured convolutions, each successive convolution at least partially overlapping all preceding convolutions.

* * * * *